US005973999A

United States Patent [19]

Naff et al.

[11] Patent Number: 5,973,999

[45] Date of Patent: Oct. 26, 1999

[54] ACOUSTIC CANNON

[75] Inventors: John T. Naff, Pleasanton; James H. Shea, Castro Valley, both of Calif.

[73] Assignee: Maxwell Technologies Systems Division, Inc., San Diego, Calif.

[21] Appl. No.: 08/939,265

[22] Filed: Sep. 29, 1997

[51] Int. Cl.[6] .......... H04B 1/034; G08B 15/00

[52] U.S. Cl. .......... 367/139; 181/142

[58] Field of Search .......... 367/137, 138, 367/139; 181/142, 144, 145; 381/161, 337, 338, 339; 89/1.1, 1.11; 116/22 A; 43/124

[56] References Cited

U.S. PATENT DOCUMENTS

| | | | |
|---|---|---|---|
| 2,552,970 | 5/1951 | Horsley et al. . | |
| 3,039,559 | 6/1962 | Ellsworth . | |
| 3,410,142 | 11/1968 | Daiber et al. . | |
| 3,557,899 | 1/1971 | Longinette et al. . | |
| 3,756,344 | 9/1973 | Daiber et al. . | |
| 3,804,021 | 4/1974 | McGirr . | |
| 4,287,768 | 9/1981 | Hayakawa et al. | 73/626 |
| 4,349,898 | 9/1982 | Drewes et al. . | |
| 4,757,227 | 7/1988 | Danley et al. . | |
| 4,769,794 | 9/1988 | Beuter et al. . | |
| 4,882,974 | 11/1989 | Reuter et al. . | |
| 4,912,869 | 4/1990 | Govett . | |
| 5,081,900 | 1/1992 | Buntzen et al. . | |
| 5,225,638 | 7/1993 | Quint . | |
| 5,259,289 | 11/1993 | Peries et al. . | |
| 5,269,214 | 12/1993 | Badura et al. . | |
| 5,473,836 | 12/1995 | Liu . | |
| 5,606,297 | 2/1997 | Phillips | 381/159 |

*Primary Examiner*—Ian J. Lobo
*Attorney, Agent, or Firm*—Gregory S. Rosenblatt; Wiggin & Dana

[57] ABSTRACT

An acoustic cannon has a plurality of acoustic sources with output ends symmetrically arranged in a planar array about a central point. Pressure pulses are generated in each acoustic source at substantially the same time. The pressure pulses exit the output ends as sonic pulses. Interaction of the sonic pulses generates a Mach disk, a non-linear shock wave that travels along an axis perpendicular to the planar array with limited radial diffusion. The Mach disk retains the intensity of the sonic pulses for a time and a distance significantly longer than that achievable from a single sonic source. The acoustic cannon is useful as a non-lethal weapon to disperse crowds or disable a hostile target.

15 Claims, 5 Drawing Sheets

ACOUSTIC CANNON

BACKGROUND OF THE INVENTION

1. Field of the Invention

This invention relates to an acoustic device that emits repetitive sonic pulses capable of dispersing or incapacitating a biological target. More particularly, a planar array of multiple acoustic pulse sources cooperates to generate highly focused pulses of high intensity sonic energy over a small area.

2. Description of the Related Art

Military and law enforcement personnel have a need for non-lethal weapons. Such weapons are useful in riot control to disperse a hostile crowd. In sniper and hostage situation, a non-lethal weapon provides a means to neutralize a hostile target without collateral damage to hostages, bystanders or property. In combat, a non-lethal weapon is useful to neutralize sentries and warning devices. Since the weapon produces casualties, rather than fatalities, each hit removes three opponents, the injured and a two-person rescue squad, from the combat zone instead of the one person removed by a fatality.

High intensity sound pulses have a debilitating effect on biological targets. Humans become disoriented by exposure to sonic pulses exceeding a threshold of pain of about 150 decibels (dB). Eardrum rupture occurs at about 190 dB, the threshold for pulmonary injury is about 200 dB and the onset of lethality is about 220 dB.

U.S. Pat. No. 3,557,899 to Longinette et al. discloses a parabolic reflector that focuses and transmits a continuous sound at a frequency of between 8 kilohertz (kHz) and 13 kHz. Within this frequency range, sound attenuates rapidly and the disclosed device is believed effective only at close ranges. The U.S. Pat. No. 3,557,889 patent discloses utilizing the device in close proximity to a riot or in enclosed areas, such as a bank vault.

U.S. Pat. No. 4,349,898 to Drewes et al. discloses a sonic weapon to destroy buildings and disable personnel. A plurality of tubes each conduct a continuous sound generated by a jet engine. Rotating fans at the ends of the tubes create pulsed sound of a desired frequency. The fan speeds are set such that each tube has a pulse sound frequency two times the frequency of a preceding tube leading to an additive effect of sound waves referred to as a parametric pump. The disclosed device appears heavy and requires careful alignment of a number of large apparatus for operation.

There remains, therefore, a need for a portable acoustic weapon capable of dispersing or disabling biological targets at distances of up to 100 meters that does not suffer from the disadvantages of the prior art discussed above.

SUMMARY OF THE INVENTION

Accordingly, it is an object of the invention to provide an acoustic device capable of dispersing or incapacitating a biological target. One feature of the invention is that the device has a planar array of simultaneously actuated acoustic pulse sources. Interaction between the sonic pulses forms a Mach disk. A second feature of the invention is that the device is actuated by either a shock tube or detonation of an explosive chemical mix.

Among the advantages of the invention are that the Mach disk is a compact packet of sound that may be accurately fired to minimize harm to hostages, bystanders and property. The Mach disk effectively incapacitates or disperses a biological target with a minimal threat of lethality. The acoustic device is relatively lightweight and is readily transported by an infantry vehicle and operated by a single person.

In accordance with the invention, there is provided an acoustic cannon that has a plurality of acoustic sources arranged in a planar array about a central point. Each of the plurality of acoustic sources has an input end and an output end. The input end receives a sonic pulse and the output end transmits a sonic output. A sonic pulse generator is coupled to each of the input ends and a timing mechanism is coupled to the sonic pulse generator such that the sonic pulse is received by each of the input ends at substantially the same time and is of substantially the same frequency and duration. The combination of the planar array and the parameters of the sonic output effectively generates a Mach disk.

The above stated objects, features and advantages will become more apparent from the specification and drawings that follows.

IN THE DRAWINGS

Figure 6:
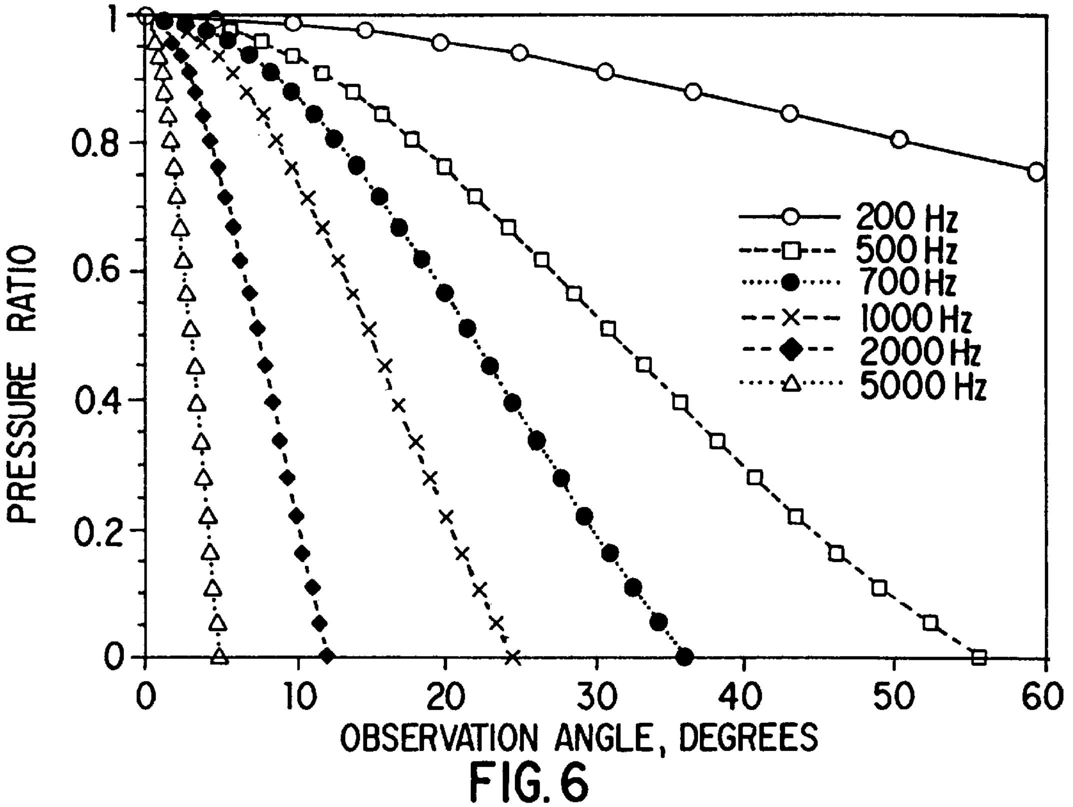

FIG. 6 graphically illustrates the relationship between frequency content of the sonic pulse and directivity.

Figure 7:
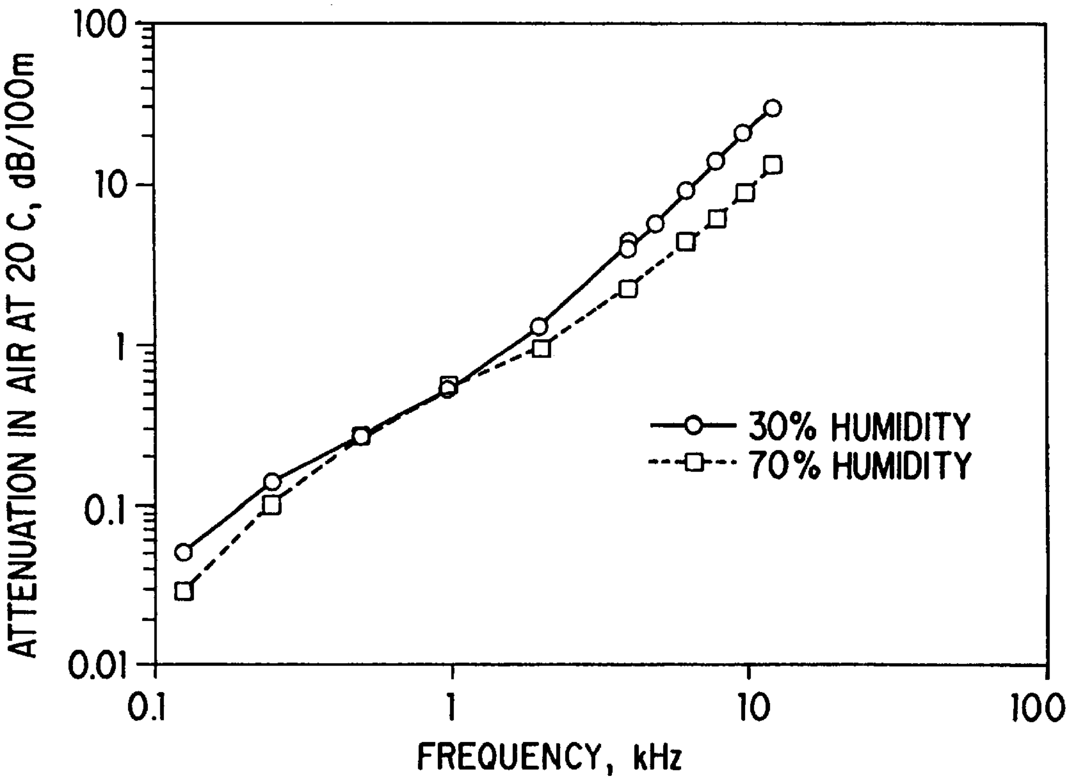

FIG. 7 graphically illustrates the relationship between frequency contained in the sonic pulse and attenuation.

Figure 8:
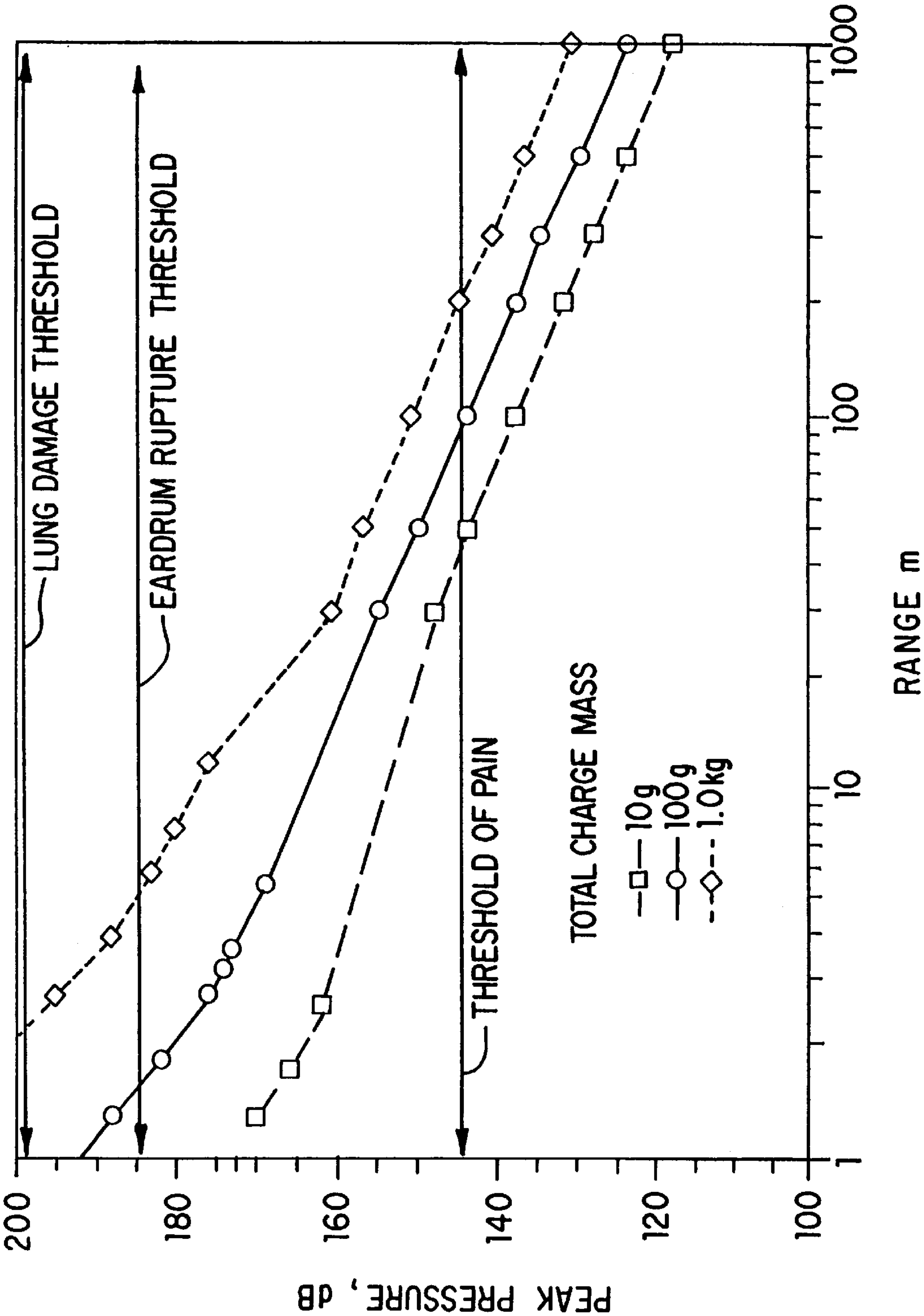

FIG. 8 graphically illustrates the relationship between pulse range and peak pressure measured in decibels.

DETAILED DESCRIPTION

Figure 1:
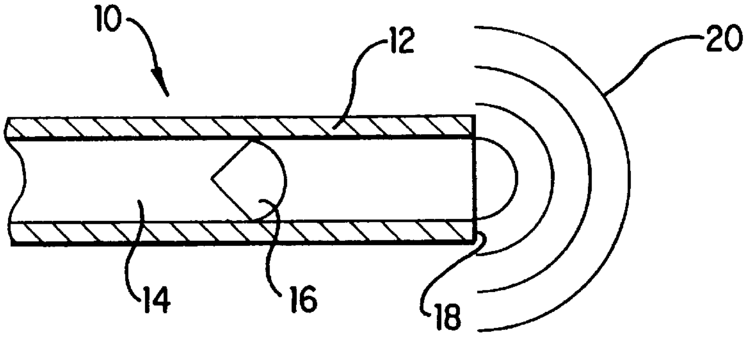
FIG. 1 PRIOR ART
FIG. 1 shows in cross-sectional representation a single sonic source as known from the prior art.

FIG. 1 illustrates in cross-sectional representation a muzzle portion 12 of an acoustic device 10 as known from the prior art. A sonic source (not shown) generates a pressure wave 16 that is transmitted along an interior bore 14 and emitted from an output end 18 as spherically expanding sound waves 20. The spherically expanding sound waves 20 diffuse rapidly. The prior art acoustic device has limited value as a weapon. The strength of the pressure wave 16 drops to below useful values within a very short distance and time. Additionally, the spherically expanding sound waves 20 diffuse over a broad area rendering target selectivity difficult or impossible.

Figures 2A, 2B:
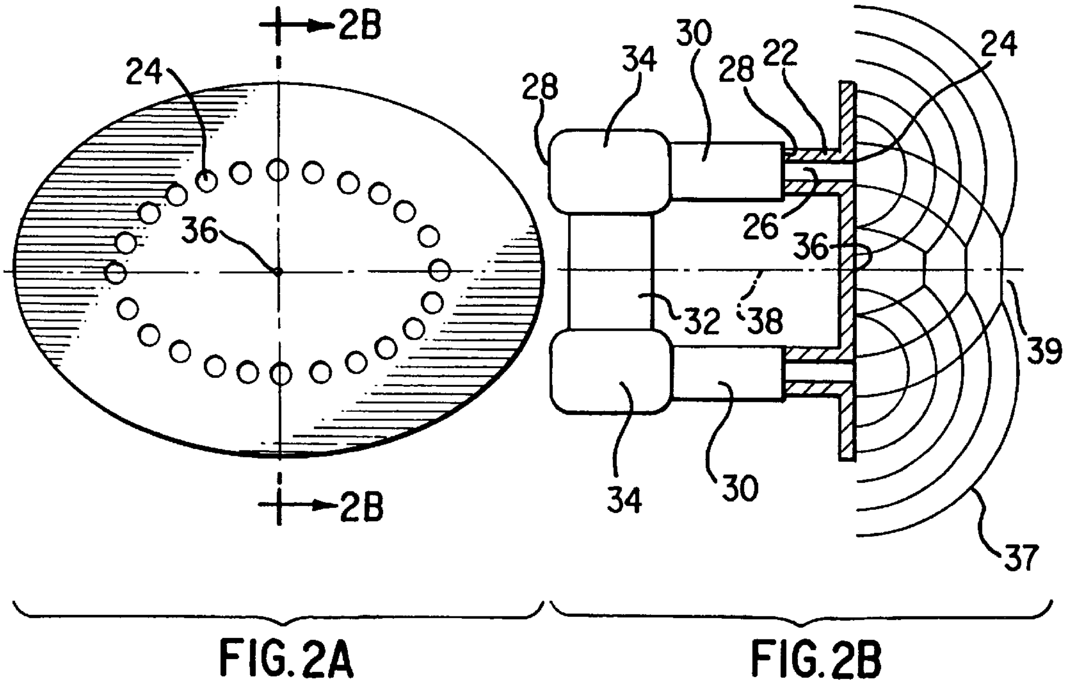
FIGS. 2A and 2B illustrate the acoustic cannon of the invention.

The disadvantages of the prior art are resolved by an acoustic cannon in accordance with the present invention. FIG. 2 schematically illustrates a portion of the acoustic cannon of the invention in Front (FIG. 2A) and Side (FIG. 2B) Views. Acoustic sources 22 terminate at an output end 24. Interior bores 26 extend from output ends 24 to input ends 28 that are adjacent to a sonic pulse generator 30. A timing mechanism 32 controls the rate and duration of generated sonic pulses. In a first embodiment of the invention, the sonic pulses are generated by detonation of an explosive mix and a fuel storage chamber 34 is provided to house required quantities of the additional explosive mix, or explosive mix precursors.

The Front View (FIG. 2A) illustrates the output ends 24 arranged in a generally planar array having symmetry about a central point 36. The planar array may be configured as any shape, with symmetric shapes preferred to optimize the sonic output. A most preferred configuration is elliptical, including circular, arrays. The number of output ends 24 in the planar array is at least two to provide directivity and at least three to provide a symmetric array. Preferably, there are at least four output ends 24 in the planar array. More preferably, there are from about 10 to about 40 output ends and most preferably, from about 20 to about 30 output ends.

As illustrated in the Side View (FIG. 2B), when sonic pulses of substantially the same amplitude and duration are emitted from each of the output ends 24 at essentially the same time, the shock waves 37 interact along a longitudinal axis 38, running parallel to the longitudinal axis of the interior bore 26 and extending outwardly from the central point 36. Interaction of the shock waves 37 from the plurality of output ends 24 generates a Mach disk 39. The output has some of the characteristics of an acoustic soliton, although while a soliton does not change shape with propagation, the shock-driven output pulses of the invention are expected to undergo relatively slow and predicable changes in shape.

The Mach disk is a non-linear shock wave that travels rapidly along the longitudinal axis 38 with limited radial diffusion over distances of up to 100 meters. The intensity of the shock wave 37 contained within the Mach disk 39 decreases more slowly over distance and time than the $1/(\text{range})^2$ behavior of a single spherical expanding pulse.

If the same energy is used in a multiple tube source having a planar array of outputs as in a single output source, the on-axis peak pressure for the multiple tube source, in the direction of maximum directivity, is $n^{2/3}$ times that of the single tube. The $n^{2/3}$ factor is derived from a linear superposition of the predicted pressure pulses from individual sources, which will all be of shorter duration than a single pulse derived from a single source using the same total energy. With multiple sources, energy from each individual source is concentrated in a shorter on-axis pulse. At the same range from the array, the resulting peak pressure is greater by this factor compared to the peak pressure associated with a single source of equivalent total energy. The attenuation rates of the peaks with distance will be essentially the same for single and multiple sources.

For a 10 tube array having the same output energy as a single tube, the sound pressure, along the longitudinal axis, is 4.6 times higher than for the single tube at similar times and distances.

Figure 3:
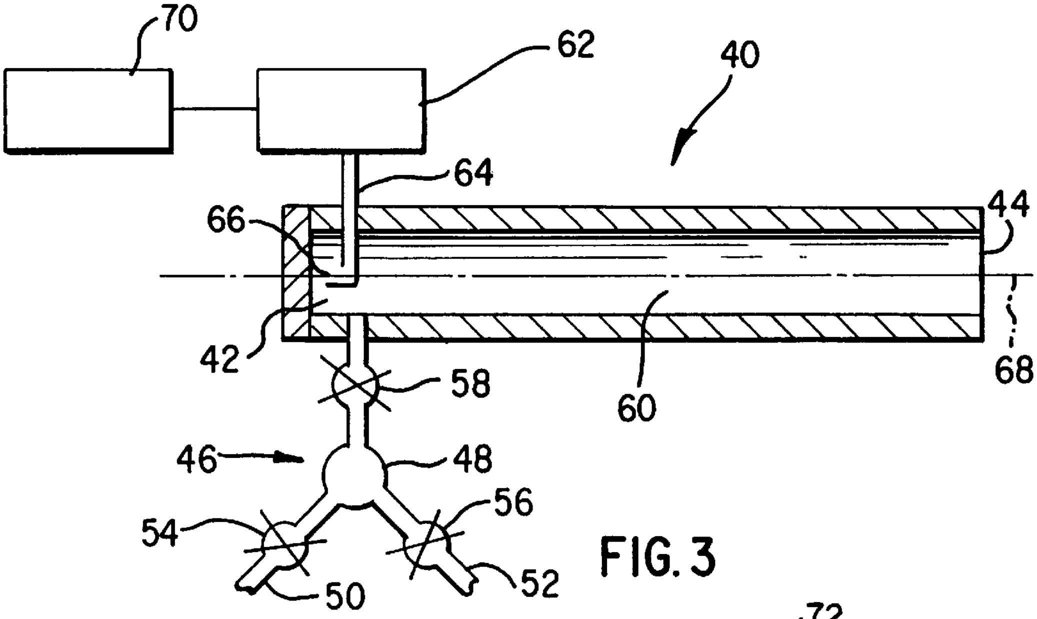
FIG. 3 illustrates in cross-sectional representation an acoustic cannon in accordance with a first embodiment of the invention FIGS. 4A through 4E graphically illustrate the generation of a sonic pulse through the use of a shock tube.

FIG. 3 illustrates in cross-sectional representation an acoustic source 40 for use with the acoustic cannon of the invention in accordance with one embodiment. The acoustic source 40 has an input end 42 and an output end 44. The input end 42 receives sonic pulses and the output end 44 transmits the sonic output as a portion of a planar array of outputs to generate a Mach disk.

Coupled to the input end 42 is a sonic pulse generator 46. The sonic pulse generator 46 detonates an explosive mix of gases or vaporized liquids. A first fluid component, that could be a gas, a liquid, or a mixture thereof, is delivered to a mixing chamber 48 through a first conduit 50. A second fluid component is delivered to the mixing chamber 48 through a second conduit 52. A first fluid control valve 54 and a second fluid control 56 determine the ratio of first fluid to second fluid in the mixing chamber 48. While stoichiometric ratios of the fluids are preferred, a stoichiometric ratio is not required. Any fluid mix ratio that generates an explosive shock wave on ignition is suitable. A third fluid control valve 58 introduces a desired volume of mixed fluid into the barrel 60 of the acoustic source 40. The desired volume of fluid substantially fills the barrel 60.

The fluid control valves 54,56,58 are any suitable type of fluid metering system. Since the first fluid control valve 54 and the second fluid control valve 56 control fluid ratios, adjustable manual valves are suitable. The third fluid control valve 58 accurately and repeatedly delivers the mixed fluid to barrel 60. Rapid repetition rate is frequently required and the third fluid control valve 58 is preferably an electrically actuated solenoid valve.

A power supply 62 generates a voltage potential between electrodes 64 that exceeds the breakdown voltage of the mixed fluid contained within the barrel 60 thereby generating a spark at gap 66. An effective voltage potential is from about 10 kilovolts to about 100 kilovolts. To optimize generation of the Mach disk, the interior bore of the barrel 60 is preferably symmetric about a longitudinal barrel axis 68. More preferably, the interior bore is circular in cross-section and the spark gap 66 aligned along the longitudinal axis 68.

A timing mechanism 70 is coupled to the sonic pulse generator and controls power source 62, third fluid control valve 58, or preferably, both devices. The timing mechanism 70 ensures that each of the plurality of acoustic sources is fired at substantially the same time for effective generation of the Mach disk.

A number of different fluid combinations produce effective shock waves that exit the acoustic source 40 as a strong sonic pulse. Preferred fluids are combinations of gases and include hydrogen/oxygen, oxygen/propane, air/propane, air/acetylene, oxygen/acetylene and the like. A preferred explosive fluid mixture is hydrogen and oxygen in approximately stoichiometric quantities (atomic ratio of H:O of 2:1). For this mixture, a voltage pulse in the range of from about 30 kilovolts to about 50 kilovolts, and typically about 40 kilovolts, for a duration of 1 microsecond is effective. Atomized or vaporized liquid fuels such as gasoline, can also be mixed with oxygen or air as an effective mixed fluid.

Rather than mixed fluids to generate the sonic pulse on detonation, solids fuels can be used. The solid fuels would be packaged in a manner similar to blank shells, but would be larger and have more energy per package than the usual gun blanks. An electronic squib or a percussive primer is used to detonate the solid fuel. Automatic reloading of the solid fuel shells could be accomplished in a manner that is conventional for guns or cannons to accomplish a desired repetition rate.

Figure 4A:
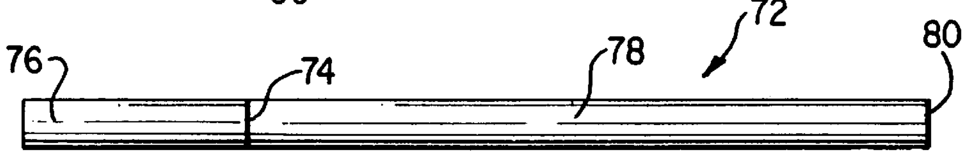

A most preferred acoustic source is an electrically triggered shock tube. Shock tubes are disclosed in U.S. Pat. No. 3,410,142 to Daiber et al. that is incorporated by reference in its entirety herein. With reference to FIG. 4A, the shock tube 72 is tubular with an interior bore centrally running therethrough. A frangible diaphragm 74 separates the shock tube 72 into a high pressure region 76 and a low pressure region 78. When frangible diaphragm 74 is ruptured, the pressure differential between the high pressure region 76 and the low pressure region 78 generates a shock wave that travels the length of the low pressure region 78 and is emitted from the shock tube 72 at output end 80 as a sonic pulse.

Figure 4B:
Figure 4C:
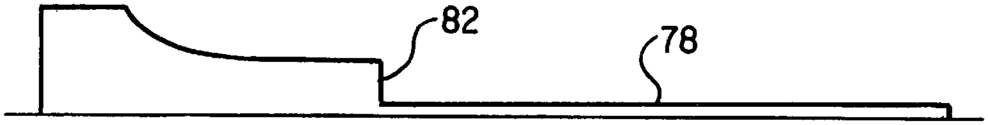
Figure 4D:
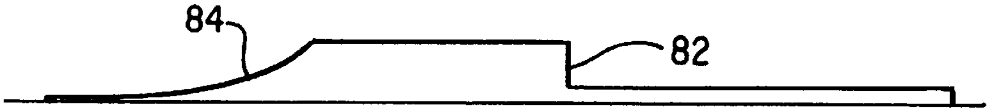
Figure 4E:
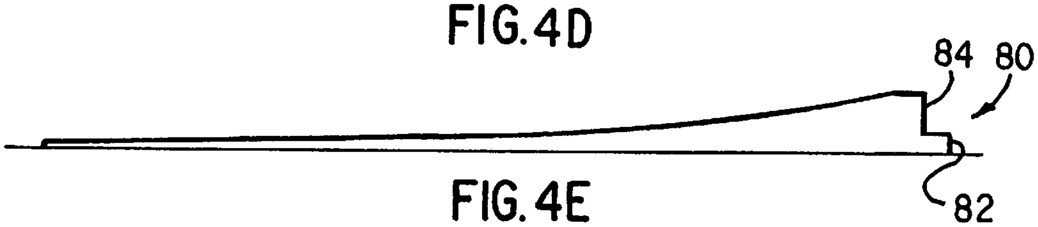

FIGS. 4B through 4E illustrate the generation of the sonic pulse. In FIG. 4B, the initial pressure distribution of the shock tube prior to rupture of the frangible diaphragm 74 is illustrated showing the high pressure region 76 and low pressure region 78. Shortly after rupture of the frangible diaphragm 74, a shock wave 82 begins to traverse the low pressure region 78. Trailing the shock wave 82, but traveling at a higher velocity is a rarefaction wave 84. As indicated in FIG. 4E, adjacent to the output end 80, the rarefaction wave 84 catches up with the shock wave 82, generating a high energy sonic pulse.

Figure 5:
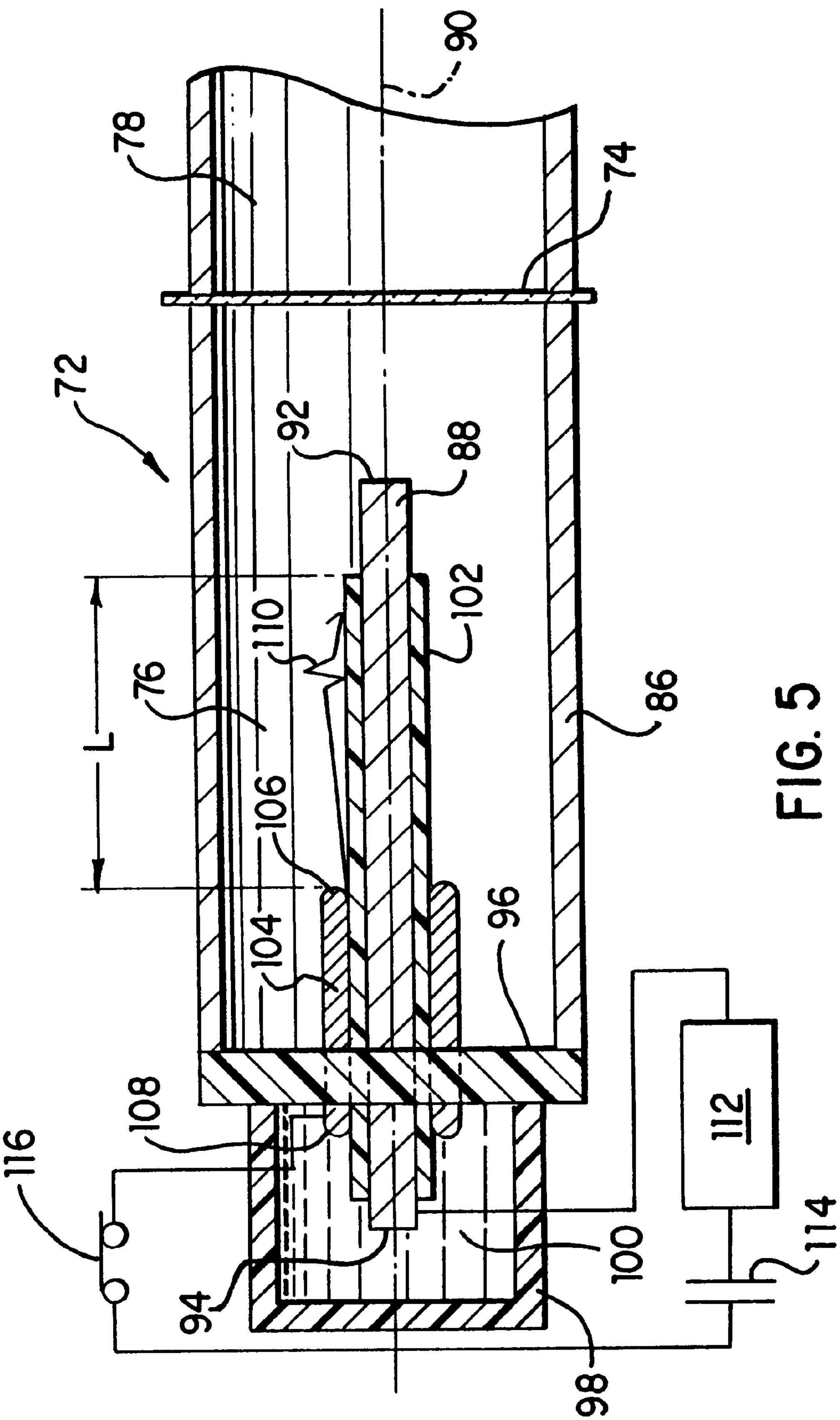
FIG. 5 illustrates in cross-sectional representation an acoustic cannon in accordance with a second embodiment of the invention.

FIG. 5 illustrates the incorporation of a shock tube 72 into the acoustic cannon of the invention. The shock tube 72 has a high pressure region 76 and low pressure region 78 separated by a frangible diaphragm 74. Prior to actuation, both the high pressure region 76 and low pressure region 78 are at substantially the same pressure. Preferably, prior to actuation, both regions are filled with air at ambient pressure. Frangible diaphragm 74, typically a thin sheet of plastic or other brittle material, is inserted into a notch formed through the housing 86 of shock tube 72 and separates the high pressure region 76 from the low pressure region 78.

To actuate the acoustic cannon, the gas pressure in the high pressure region 76 is increased by any suitable means. A preferred means is electric arc heating. A first electrode 88 extends longitudinally through a portion of the high pressure region 76 centered about a longitudinal axis 90 of the shock tube 72. A front end 92 is proximate to the frangible diaphragm 74, but preferably the front end 92 does not contact the frangible diaphragm 74. A rear end 94 extends through a rear wall 96 of the high pressure region 76 terminating in a reservoir 98 containing a high dielectric fluid 100 having a resistivity in excess of about $10^6$ ohm-cm. One suitable dielectric is conventional transformer oils. The oil is for insulation only, other methods of high voltage insulation are equally suitable.

Encasing a substantial portion of the first electrode 88 is a dielectric insulator 102. The dielectric insulator 102 covers an entire mid-portion of the first electrode 88, exposing only a desired small amount of the front end 92 and the rear end 94.

Disposed about a portion of the dielectric insulator 102 is a second electrode 104. The second electrode 104 has a front end 106 disposed within the high pressure region 76 and a rear end 108 disposed within the high dielectric fluid 100 of reservoir 98.

The dielectric insulator 102 defines a longitudinal length, L, between the second electrode 104 and the front end 92, that regulates heating of the gas contained within the high pressure region 76.

When the shock tube 72 is actuated, an electric spark 110 is emitted and traverses along the surface of the dielectric insulator 102 from the second electrode 104 to the front end 92 of the first electrode 88. Increasing the length, L, increases the time that the gases are exposed to the electric spark increasing heating of the gases. As the gases are heated, they expand, generating a pressure differential between the high pressure region 76 and low pressure region 78. Increasing the length of L, increases the heating of the gases, increasing the expansion thereof, thereby increasing the pressure differential and intensity of the shock wave ultimately emitted from the shock tube.

To actuate the shock tube 72, a power supply 112 charges a capacitor 114. The voltage difference between the first electrode 88 and second electrode 104 must exceed the breakdown voltage of the gas contained within the high pressure region 76. For air, a voltage differential of in excess of 100 kilovolts, and preferably on the order of 150 kilovolts is utilized. A timing mechanism (not shown) actuates all shock tubes 72 of the acoustic cannon at substantially the same time by electronically closing a switch 116, thereby completing the circuit. Preferably the length L is from about 6 inches to about 36 inches. The spark will traverse a distance in excess of one foot in less than 2 microseconds.

After each burst of the shock tube, the frangible diaphragm 74 must be replaced. The pulse repetition rate is from about 0.1 to about 5 seconds and preferably from about 0.5 to about 2 seconds.

Rapid replacement of the frangible diaphragm is achieved by mechanical means. An advantage with the electric heated shock tube of the invention is that the frangible diaphragm 74 may be omitted. The gas in the high pressure region 76 is heated faster than the pressure can be relieved. The result is a pressured region that expands as a shock wave from the end of the barrel.

The frequency content of the sonic pulses is controlled by the barrel length. The output of the pulsed acoustic source is a single pulse that has Fourier components that range over a range of frequencies. The principal, or dominant, frequency will primarily be dependent on the duration of the high-pressure portion of the pulse, that can be controlled to a first order by the energy in the individual shock sources and by the barrel length.

As illustrated in FIG. 6, to maintain high directivity, the minimum dominant frequency of the sonic pulses is in excess of about 1 kHz, and preferably in excess of about 2 kHz.

As illustrated in FIG. 7, attenuation increases as the frequency increases such that the maximum dominant frequency of the sonic pulses is preferably less than about 7 kHz, and more preferably, less than about 5 kHz.

The sound intensity is selected to provide a desired effect to the biological target, dependent on the application. While the effect of sound is subjective and dependent on an individual's physiology, the Table 1 guidelines are illustrative.

TABLE 1

| Effect | Sonic Intensity | Shock Wave Pressure |
|---|---|---|
| Threshold of Pain | 145 dB | |
| Eardrum Rupture | 185 dB | 5–6 psi |
| Pulmonary Injury | 200 dB | 30 psi |
| Lethality | 220 dB | 100 psi |

As graphically illustrated in FIG. 8, a sonic generator having a mass equivalent to the "total charge mass" equivalency of trinitrotoluene (TNT) is capable of producing a shock pulse effective to cause disorientation and debilitation, without permanent injury, over distances of from less than 10 meters to in excess of 100 meters. The FIG. 8 distances were computed based on a single sonic source and do not include the $n^{2/3}$ factor that is obtained using multiple sources. As such, FIG. 8 illustrates the minimum over-pressure values at a given range for different values of the source strength (energy). Incorporation of the $n^{2/3}$ factor for multiple sources substantially increases the effective range for a given over-pressure level.

It is anticipated that the acoustic cannon of the invention will weigh less than 50 kilograms and occupy a net volume of about 1 cubic meter, compatible with current light infantry vehicles.

The discrete nature of the individual pulses comprising the acoustic radiation field essentially eliminates the presence of high-amplitude side lobes, but there will also be no null positions. Off-axis locations will experience peak pressures comparable to those characteristic of the peaks for individual sources at the same distance, but possibly for somewhat longer duration. Consequentially, ear protection for the operators is recommended.

The advantage of the acoustic cannon of the invention is illustrated by the Example that follows.

EXAMPLE

Four acoustic tubes each having an inside diameter of 6 inches and a length of 12 inches were placed at the corners of a 36 inch square. Each tube was charged with a mixture of hydrogen and oxygen in approximate stoichiometric ratio. The gaseous mixture of each tube was simultaneously ignited by an electric spark, generating four shock waves that cooperated in the formation of a Mach disk. The acoustic pressure at a distance of 50 feet from the output ends of the acoustic tubes, was measured to be in excess of 165 dB (greater than 0.7 psi over-pressure) effective to provide deterrence and debilitation.

It is apparent that there has been provided in accordance with the present invention an acoustic cannon that fully satisfies the objects, means and advantages set forth hereinabove. While the invention has been described in combination with embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

We claim:

1. An acoustic cannon, comprising:

a plurality of acoustic sources each having an input end and an output end with an interior bore disposed therebetween, each said input end receiving a plurality of discrete sonic pulses and each said output end emitting a sonic output in the form of discrete sonic pulses;

a sonic pulse generator coupled to each said input end; and a timing mechanism coupled to said sonic pulse generator such that each one of said discrete sonic pulses is received by each one of said input ends at substantially the same time and is of substantially the same frequency and duration when emitted from each one of said output ends whereby a plurality of said sonic outputs interact to generate a shock-driven output pulse.

2. The acoustic cannon of claim 1 wherein said plurality of output ends form a planar array about a central point and there are a minimum of three said output ends.

3. The acoustic cannon of claim 2 wherein there are from about 10 to about 40 of said output ends arrange symmetrically about said central point.

4. The acoustic cannon of claim 3 wherein there are from about 20 to about 30 of said output ends arranged as an ellipse about said central point.

5. The acoustic cannon of claim 3 wherein said sonic pulse generator includes a source of an explosive fluid, a spark gap disposed within said interior bore, a power supply coupled to said spark gap and a fluid control valve to deliver a desired amount of said explosive fluid to said interior bore.

6. The acoustic cannon of claim 5 wherein said explosive fluid is a mixture selected from the group consisting of hydrogen/oxygen, oxygen/propane, air/propane, air/acetylene, oxygen/acetylene, oxygen/gasoline, and air/gasoline.

7. The acoustic cannon of claim 6 wherein said explosive fluid is a mixture of hydrogen and oxygen and said power supply is capable of delivering a pulse of from about 30 kilovolts to about 50 kilovolts to said spark gap.

8. The acoustic cannon of claim 3 wherein said sonic pulse generator includes a solid explosive mix, an explosive squib coupled to said explosive mix and a power supply coupled to said explosive squib.

9. An acoustic cannon, comprising:

a plurality of acoustic sources each having an input end and an output end with an interior bore disposed therebetween, each said input end receiving a plurality of discrete sonic pulses and each said output end emitting a sonic output in the form of discrete sonic pulses;

a sonic pulse generator coupled to each said input end, said sonic pulse generator including a shock tube having a high pressure region and a low pressure region whereby a differential between said high pressure region and said low pressure region is effective to generate a shock wave; and a timing mechanism coupled to said sonic pulse generator controlling interaction of said high pressure region with said low pressure region and the generation of said sonic pulses such that each one of said discrete sonic pulses is received by each one of said input ends at substantially the same time and is of substantially the same frequency and duration when emitted from each of said output ends whereby a plurality of said sonic outputs interact to generate a shock-driven output pulse.

10. The acoustic cannon of claim 9 wherein a first electrode having a front end extends through said high pressure portion, a dielectric layer coats said first electrode except for said front end, and a second electrode extends into said high pressure portion and is spaced from said front end by a distance, L.

11. The acoustic cannon of claim 10 wherein L is from about 6 inches to about 36 inches.

12. The acoustic cannon of claim 11 wherein a power supply capable of generating a voltage pulse of at least 100 kilovolts between said first electrode and said second electrode once every 0.5 seconds to every 2 seconds is coupled to said timing mechanism.

13. A method for incapacitating a biological target, comprising the steps of;

generating multiple, discrete, sonic pulses in the form of a Mach disk with a dominant frequency of between about 2 kHz and about 5 kHz and an intensity from about 150 decibels to about 200 decibels by substantially simultaneously emitting sonic pulses from a plurality of output sources that are arranged in a planar array, wherein said sonic pulses are generated by rapid heating of a gas contained within a high pressure region of a shock tube; and directing said multiple, discrete sonic pulses in the form of a Mach disk at said biological targets.

14. The method of claim 13 including the steps of filling said high pressure region and said low pressure region with air at ambient pressure and then rapidly heating the air in the high pressure region thereby expanding the air contained therein.

15. The method of claim 14 wherein said air is rapidly heated by exposure to an electric spark for a required length of time.

* * * * *